(No Model.) 4 Sheets—Sheet 1.
W. P. KIMBRELL.
COMBINED HAY RACK, HAY STAND, AND STOCK WAGON.
No. 526,039. Patented Sept. 18, 1894.
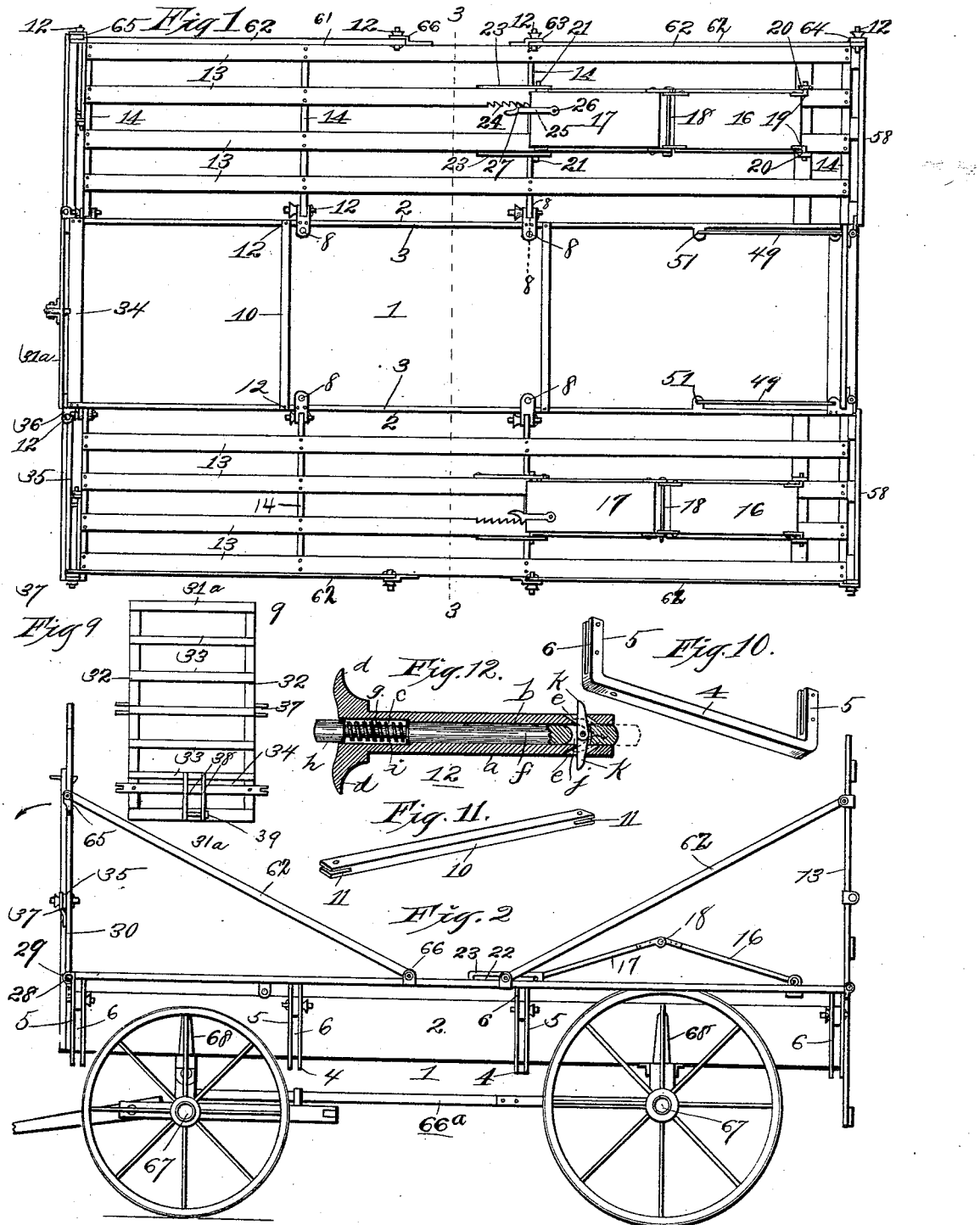

(No Model.) 4 Sheets—Sheet 2.
W. P. KIMBRELL.
COMBINED HAY RACK, HAY STAND, AND STOCK WAGON.
No. 526,039. Patented Sept. 18, 1894.
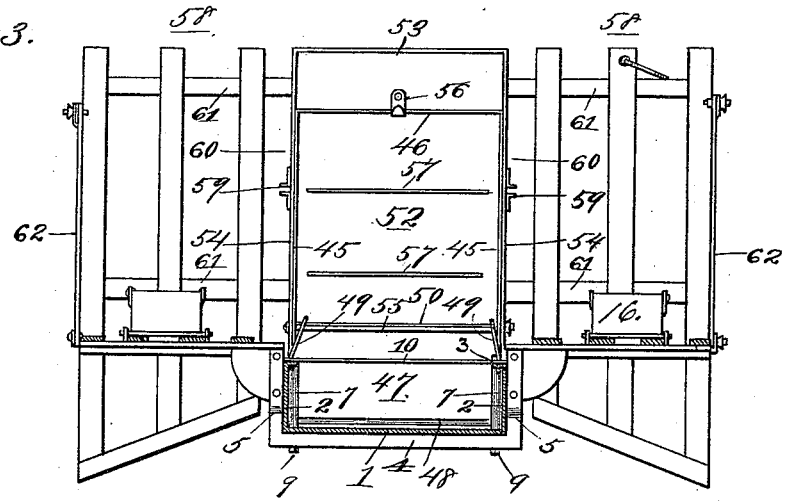
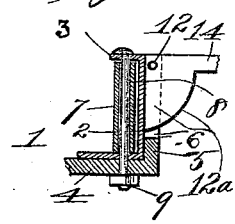
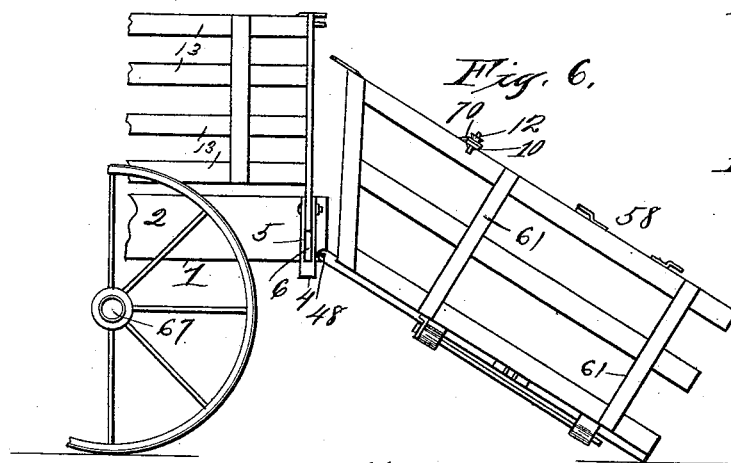
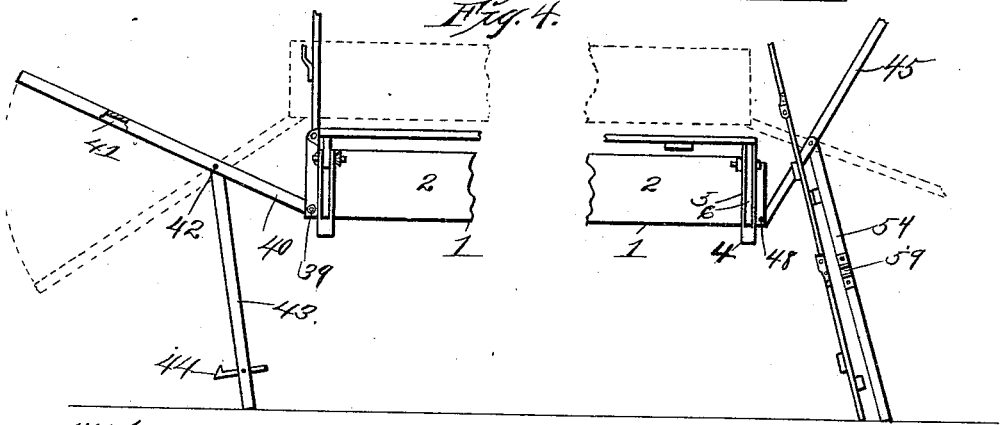
Witnesses:
W. P. Smith
G. Y. Thorpe
Inventor:
Wm. P. Kimbrell
By Higdon & Higdon
Attys

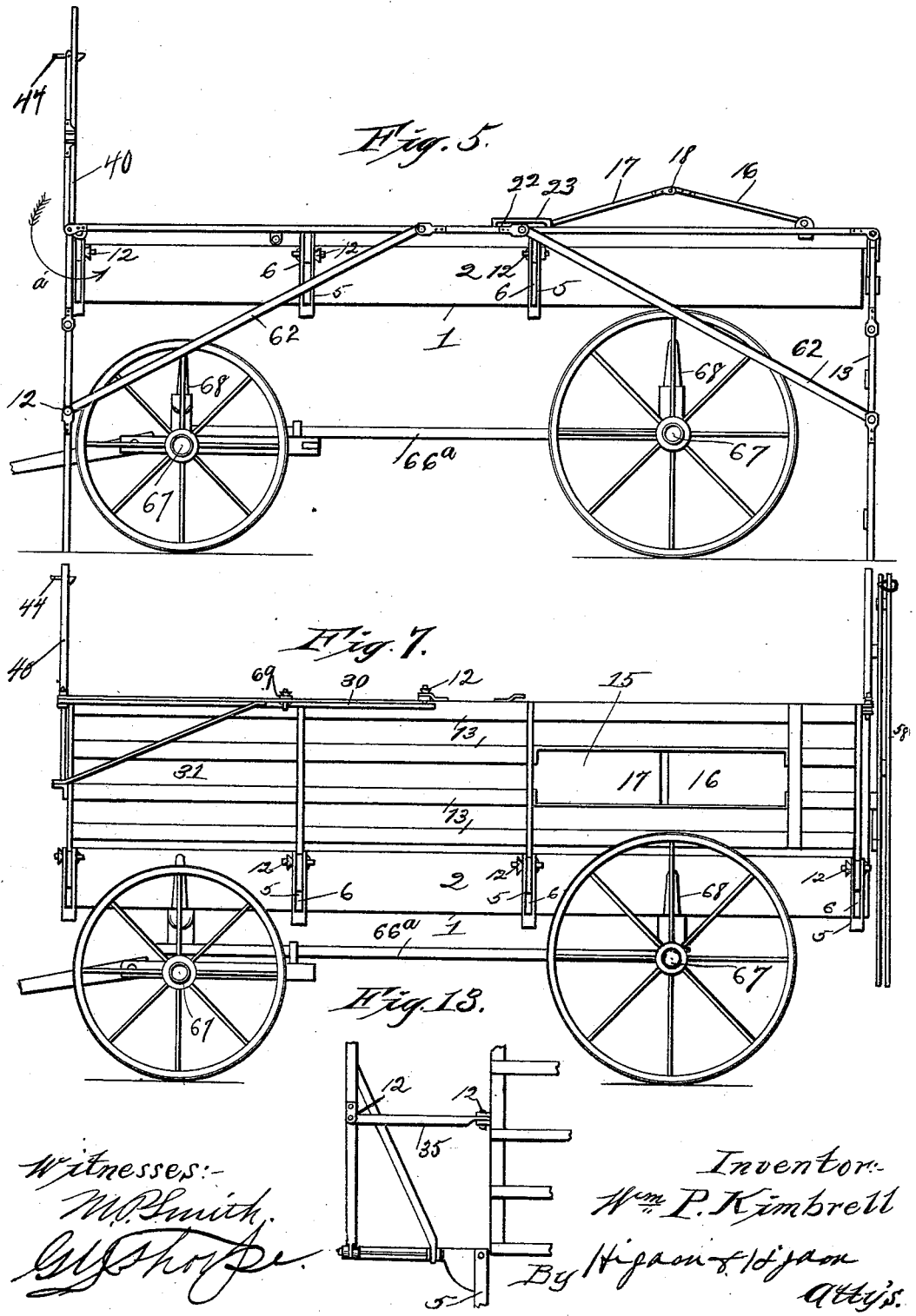

(No Model.) 4 Sheets—Sheet 4.

W. P. KIMBRELL.
COMBINED HAY RACK, HAY STAND, AND STOCK WAGON.

No. 526,039. Patented Sept. 18, 1894.

Witnesses:
G. Y. Thorpe
G. V. Chandler

Inventor:
Wm. P. Kimbrell
By Higdon & Higdon
Attys.

UNITED STATES PATENT OFFICE.

WILLIAM PRESTON KIMBRELL, OF BEAVER CITY, NEBRASKA.

COMBINED HAY-RACK, HAY-STAND, AND STOCK-WAGON.

SPECIFICATION forming part of Letters Patent No. 526,039, dated September 18, 1894.

Application filed May 12, 1893. Serial No. 473,954. (No model.)

*To all whom it may concern:*

Be it known that I, WILLIAM PRESTON KIMBRELL, of Beaver City, Furnas county, Nebraska, have invented certain new and useful Improvements in a Combined Hay-Rack, Hay-Stand, and Hog or Sheep Wagon, of which the following is a full, clear, and exact description, reference being had to the accompanying drawings, forming a part hereof.

My invention relates to improvements in a combined hay rack, hay stand and hog or sheep wagon; and the object of my invention is to produce a structure of this character which can readily and easily be converted or reconverted from one to another of these devices; also to produce a device of this character, which is comparatively simple, strong, durable and inexpensive of construction.

To the above purposes, my invention consists in certain peculiar and novel features of construction and arrangement, as will be hereinafter described and claimed.

In order that my invention may be fully understood, I will proceed to describe it with reference to the accompanying drawings, in which—

Figure 14:
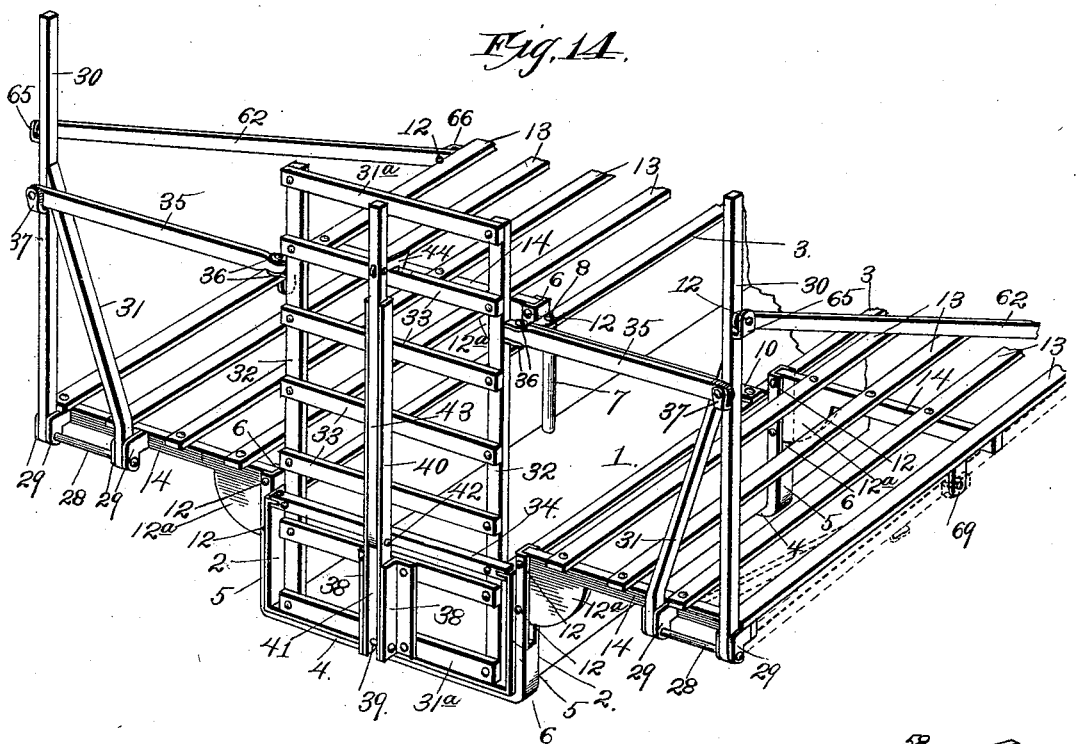
Figure 15:
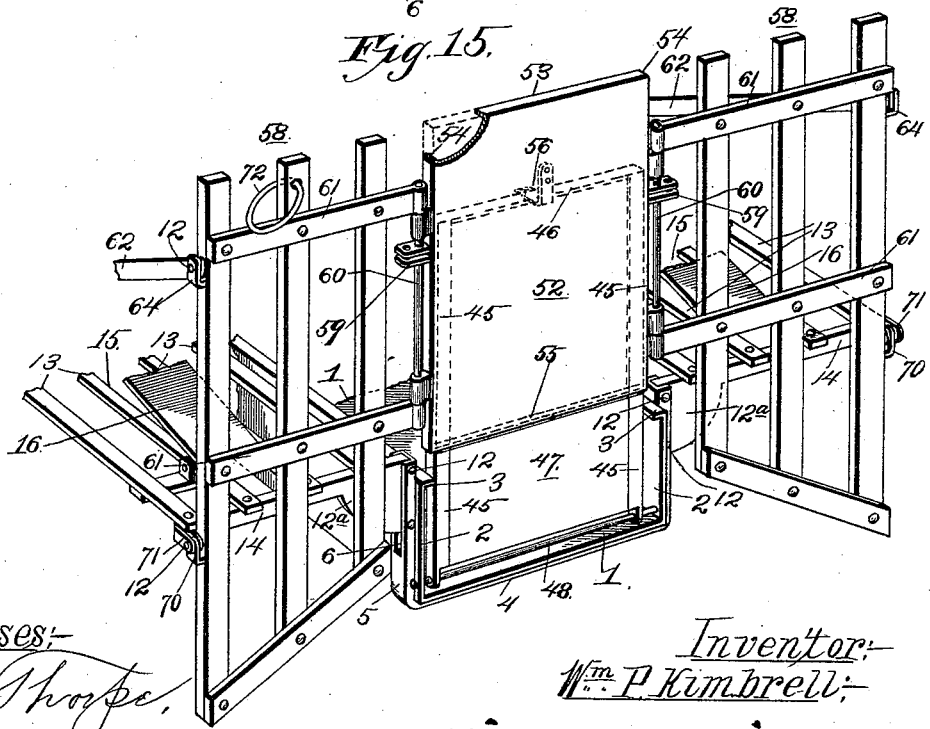

Figure 1, is a top plan view of the device constructed in accordance with my invention, and also arranged to be used as a hay-rack. Fig. 2, is a side elevation of the device shown in Fig. 1, and showing it mounted upon a wagon of any suitable construction. Fig. 3, is a vertical sectional view taken on the line 3—3 of Fig. 1 and looking toward the rear. Fig. 4, is a side elevation, of the body portion of the hay rack, and showing it in the operation of being converted into a hay-stand, and broken away at its middle. Fig. 5, is a side elevation of the device, and showing it also arranged for use as a hay stand, and showing it raised above the wagon truck, so that said wagon-truck may be drawn from under said hay stand. Fig. 6, is a side elevation of a portion of the device, and showing it arranged at one end with a chute, up which the hogs or sheep may be driven. Fig. 7, is a side elevation of the device mounted upon the wagon-truck, and showing it arranged as a hog or sheep wagon. Fig. 8, is a vertical sectional view of a portion of the bottom and one side of the rack, taken on the line 8—8 of Fig. 1. Fig. 9, is a front or outer side view of the front end-portion of the rack. Fig. 10, is a detail perspective view of one of the transverse braces for the wagon bottom. Fig. 11, is a detail perspective view of one of the transverse braces for the sides of the wagon bottom, and Fig. 12, is a central longitudinal sectional view of one of the locking pins used in coupling up the parts of this device. Fig. 13, is a view of a portion of the front end of the hay-rack, to show more clearly the arrangement of one of the end-standards. Fig. 14, is an enlarged perspective view of the front end of the device, arranged as a hay-rack. Fig. 15, is an enlarged perspective view of the rear end of the device, arranged as a hay rack.

Before entering upon a detailed description of the invention, I wish to bring forward in a general way, the several operations to be performed or steps to be taken in order to transform the structure from one device into the others. Therefore I provide a hay-rack, which mounted upon a wagon-truck, suitable for the purpose, forms a hay wagon by which the hay may be conveyed where desired. This hay rack, being of peculiar construction may now be converted into a hay stand, so that the wagon truck may be removed, and without disturbing the load of hay. After the hay is removed, one end of the stand may be converted into a chute, so that the hogs or sheep may be driven into the stand. The wagon truck is now backed under the stand as before and the stand is converted into a hog or sheep wagon, from which the animals cannot escape.

I will first describe the device as a hay-rack and then describe the method of changing it into the several other devices.

Referring to the drawings, 1 designates the bottom of the rack, which is preferably of oblong rectangular form as shown, and is formed with the upwardly extending vertical sides 2; these sides 2 being formed at their upper and inner margins with the horizontal flanges 3. Transverse brace-bars are placed at intervals and are so arranged that the body-portion 4 of each rests against the under side of the bottom 1, and the side arms 5 rest vertically against the outer sides of the sides 2; these arms 5 being formed each with a vertical groove 6, the object of which will be hereinafter explained. To secure these brace bars in position, and also to brace the sides of the bottom-portion of the hay-rack, sleeves 7 of suitable length to bear at their opposite ends against the under side of the flanges 3 and the bottom of the wagon are provided, one of said sleeves being arranged vertically over each end of the body portion 4 of the brace bars, and tie-bolts 8 are passed vertically downward through the flanges 3, the sleeves 7, and the body-portion of the brace bars until their heads rest upon the flanges 3, and have their projecting ends engaged by clamping-nuts 9.

To brace the sides 2 laterally, the removable braces 10, are arranged horizontally and transversely, so that their ends 11 shall rest upon the flanges 3. A pin, 12, of peculiar construction hereinafter described is passed through each end of the brace-bars 10 and through the flanges 3, to lock them in position. A pair of racks, are formed of a series of parallel bars 13, connected together at each end and at suitable intervals, by the transverse bars 14; said bars being pivoted on locking pins 12, at their inner ends in the upper ends of the bifurcations 6 of brace-bars 4, and are also formed or provided each with a pendent extension 12ᵃ below their pivotal point having a vertical inner edge bearing against the adjacent side 2 of the bottom 1, so as to support said racks in a horizontal position as shown. A locking pin 12 is also passed through the lower end of each extension and also through the corresponding arm 5 of transverse brace bars, to secure it in position.

A longitudinal opening 15, is formed by cutting away or recessing at their adjacent edges the middle bars of each rack, for a purpose to be hereinafter explained. These openings 15 are adapted to be closed at times by adjustable covers; said covers being each composed of two sections 16—17 hinged together upon bolts 18 at their middle, and the section 16 is provided with trunnions 19 at its opposite end, which pivotally engage ears 20 projecting upward from the adjacent cross-bar 14, and the section 17 is also provided with similar trunnions 21 at its forward end, which engage and are adapted to slide in the slots 22 formed longitudinally in the brackets 23, secured to the side margins of the recessed bars 13. The inner edge of one of the bars 13 is also formed with ratchet-teeth 24, and a locking-pawl 25, pivoted at 26 upon the upper side of the section 17 of the adjustable cover, has a tooth 27 adapted to engage one of the other of the ratchet teeth 24. It will thus be seen, that if pressure be applied upon the under side of said adjustable cover, it will be contracted in length by being elevated at its middle, which causes the trunnions 21 at the forward end of the section 17 to move rearwardly in the slots 22, the pawl at the same time sliding over the ratchet teeth. If, however, pressure is applied upon the upper side of the adjustable cover, the pawl 25 engaging the abrupt end of one of the teeth 24, prevents said adjustable cover from being extended and flattened, and forms a brace by which said cover resists the pressure and sustains the weight.

Pivotally supported upon transverse and horizontal rods 28, supported in ears 29 at the forward end of each side is an end-standard, consisting of the vertical bar 30 at the outer front corner of each side rack, and the inclined brace-bar 31, securely fastened at its upper end to the vertical bar 30, about midway its height.

A rectangular frame, of width approximating the width of the bottom 1, is composed of the end bars 31ᵃ, the side-bars 32, and the intermediate step-bars 33, which extend parallel with the end bars 31ᵃ and are secured at their opposite ends to the side-bars 32. This frame is vertically erected at the front end and upon the rack-bottom 1, and is secured permanently in such position by the cross bar 34; said cross-bar being bolted to the vertical side bars of the frame and having its bifurcated ends engaging upon opposite sides of and bolted permanently to the flanges 3 of the sides 2 of the bottom. To provide an additional brace for said frame, and also to provide a lateral brace for the corner standards, a detachable brace bar 35, has its opposite ends secured by pins 12, between the ears 36 of the frame, and the vertical bar 30 and a bracket 37 secured thereto. The front-end frame, is also provided at its outer side and near its lower end with the vertical and parallel guide ears 38, between which is pivoted at 39 the lower end of a lifting lever 40. This lever is preferably U-shaped in cross section, so as to form a groove 41 in its outer side, and pivoted at its lower end at 42, a suitable distance from the pivotal point of the lever 40, is a fulcrum-post 43, which is adapted to fit snugly in the groove 41 of the lever, and project upwardly therefrom at its upper end, and is provided with a pivoted latch 44, said latch being adapted to engage one of the step-bars 33 of the end frame, and hold the lever 40 and the fulcrum-post 43 against the outer side of said frame. This lever and fulcrum-post are used to raise the front end of the rack when desired, as hereinafter referred to.

A rectangular frame, in width equal to the front end frame, is composed of the parallel side bars 45—45, the end bar 46, and the end plate 47 connecting said side bars, and is vertically erected at the rear end of the bottom 1, and has the lower ends of the side bars 45, pivotally mounted upon the tie-rod 48; said tie-rod extending transversely of the rack-bottom and passing through the sides 2 thereof. To support this frame in its vertical position, hook-rods 49, pivotally engage the inwardly projecting horizontal flange 50 formed at the upper edge of the end plate 47, and have their hooked ends engaging holes or openings 51, formed through the flanges 3 of the rack-bottom. The bars composing this rear end-frame, are formed preferably L-shaped in cross section, and a rectangular plate or door 52, formed at its upper end and sides with inwardly extending flanges 53 and 54 respectively, is fitted thereagainst at its rear side, so that the marginal flanges of said plate or door fit respectively, against the outer side of the end and side bars of the pivoted rear end-frame, and a tie-rod 55 passing through the lower ends of the side flanges 54 of the plate or door and the side bars 45 of the frame, secure the pivotal connection of the plate or door with the rear end frame.

A spring catch 56 carried at the inner side of the pivotal plate or door, is adapted to automatically engage the end bar of the end frame, to hold the pivotal plate or door in its vertical position. The pivotal plate or door is also provided at its inner side with a series of transverse step-bars 57 for a purpose to be hereinafter referred to.

A skeleton wing frame 58, of "trapezoid" form in face view is vertically arranged at each side of the pivotal plate or door so that the inclined ends thereof, shall extend outwardly and downwardly as shown in Fig. 3, and each frame is pivotally connected to the extension or bearing bracket 59 projecting from the side margins of the pivotal plate or door, by means of the vertical rod 60, which passes through the said extensions or bearing bracket 59 and also through arms projecting from the vertical edges of the plate or door 52, and the inner ends of the cross-bars 61 of each wing-frame. To secure and hold these wing-frames against the ends of the bars composing the side rack-frames, and also to brace said frames longitudinally, inclined brace-bars 62 are provided, these brace-bars being detachably secured at one end to the brackets 63, secured to the outer bars of said rack-frames by locking-pins 12; and at the opposite ends on locking pins 12, passing through brackets 64 secured to the outer sides of the wing-frames 58. Similar brace bars 62 are provided to brace the side-racks longitudinally and the end-standards, and are secured at their opposite ends upon locking-pins 12, passing through brackets 65 and 66, secured respectively to the end-standards and to the outer bars of the side-rack frames.

From the foregoing description, it will be seen that I have produced a comparatively simple and strong hay-rack, the brace-bars, levers and end frames being preferably formed of metal or other suitable material. This hay-rack may be mounted in any suitable manner upon a wheeled wagon-truck frame 66ª, but I prefer to rest the bottom directly upon the bolsters of the axles 67, and to prevent any lateral movement of the hay-rack, between upwardly extending bars or brackets 68, which fit snugly against the sides 2 of the bottom of the hay-rack. When the hay-rack thus constructed, is placed upon the wagon-truck, the rims of the rear wheels come in contact with the adjustable covers referred to, and force them to assume the position shown in Fig. 2, and at the same time form a support for the hay to be placed thereon, and a protection from said wheels. The draft animals being hitched to the wagon-truck, the hay rack may be conveyed where required and filled with hay. This hay rack may now be converted into a hay stand by releasing the latch 44 from its engagement with the step bar 33 and pivotally moving the fulcrum post 43 so that its lower end will rest upon the ground as shown in Fig. 4, and the free end of the lever 40 will project upwardly and outwardly. The pins 12 securing the side brace bars 35 are now removed, and the brace-bars 62 arranged longitudinally to brace the front end standards are also detached from the rack, allowing the end-standards pivoted at their lower ends to swing downwardly in the direction of the arrow, Fig. 2. Pressure is now applied upon the free end of the lever 40, which receiving its fulcrum from the upper end of the lifting post 43 elevates the front end of the bottom or body portion of the hay rack, as shown in dotted lines Fig. 4. The end-standards are now moved vertically beneath the front end of the wagon to the position shown in Fig. 5, their lower ends resting squarely upon the ground, and are braced in such position longitudinally by the brace bars 62 which are again pivoted at their free or lower ends to the locking pins 12, in the brackets 65 secured to said standards, as shown in Fig. 5. The lever 40 is now elevated, and the lifting post 43 is again moved to its original or normal position into the groove 41 of said lever 40, and the latch 44 is re-engaged with the cross-bar 33 of the end-frame. To raise the rear end of the hay-rack, the latch 56 is disengaged from its connection with the end bar 46 of the rear end-frame, and the plate 52 is moved pivotally downward so that its upper end will rest upon the ground as shown in Fig. 4; the wing frames 58 of course being first disengaged from their brace-bars 62, and also moved to a position parallel with the end plate or door 52 as also shown in Fig. 4, and the rear end-frame having the hook bars 49 also disengaged from the horizontal flanges 3, at the same time assumes the position shown in Fig. 4. Pressure is now brought to bear upon the outer or free end of the rear end-frame, and the rear end of the wagon is raised to the same horizontal plane as the front end, as also shown in Fig. 4 in dotted lines; the rear end-frame being again engaged under the latch 56, upon the upper end of the end plate or door 52. The rear end support composed of the end plate or door 52 and the wing frames 58 which rest upon the ground, are braced by the longitudinal bars 62, the lower or free ends of which are again engaged and locked by pins 12 in the brackets 64. The arrangement of the brace bars 62 forms practically a truss-support for the body of the rack frame and also braces the front and rear end supports. It will thus be seen that a practical and serviceable hay-stand is produced.

The wagon truck may now be drawn forwardly from under the hay stand.

To convert the device into a sheep or hog wagon, the wagon truck is again backed beneath the haystand to its normal position. The outer ends of braces 62 securing the front standards, and the wing frames and end door or plate, in their vertical position is now detached, the side racks composed of the longitudinal and transverse bars 13 and 14 respectively, are moved upwardly on their pivotal bolts 12, to the position shown in Fig. 7, and the front end standards are revolved about two hundred and seventy degrees in the direction of the arrow $a$ Fig. 5 to assume a position against the outer side of said side-racks, as shown in Fig. 7, and the end-standards are locked against the outwardly projecting brackets 69 of said side frames by means of the locking pins 12 which pass through said brackets 69 and also through the brackets 65 of the end standards. The rear end of the stand is also lowered upon the wagon truck to its original position, and the rear end-frame and the end plate or door are arranged to extend rearwardly and downwardly and rest upon the ground as shown in Fig. 6. The wing-frames 58 are now moved to the position shown in Fig. 6, and are braced in such position by one of the cross-bars 10, which engage at its opposite ends and is secured to the brackets 70 of said wing-frames by the locking pins 12. The step-bars 57 at the inner or upper side of the end plate or door, now form steps by which the animals may mount to get into the wagon. After the animals are in the wagon the rear end is closed by again pivotally moving the rear end-frame carrying the end-plate or door to its original and vertical position and securing the same by means of locking-pins 12 being passed through the brackets 59 and also through the ear or lug 71 projecting from the outer and upper corners of the side-racks. The hook-rods are also re-engaged into the holes 51 of side flanges 3, and the wing-frames 58 are folded against the rear or outer side of the end plate or door 52, and the ring or loop 72 carried by one of said wing-frames is slipped over the adjacent longitudinal bar of the other, and secure said wing-frames in position.

I will now proceed to describe the construction of the locking pins 12, which are used to couple or connect all the detachable parts of the device. The locking pin is composed of the tubular portion $a$, which is formed with the cylindrical passage $b$ and the enlarged recess $c$ communicating therewith. The tubular portion $a$, is also formed at one end with the projections $d$—$d$, and at the other with the oppositely disposed inclined slots $e$—$e$. A cylindrical rod $f$ is fitted into the cylindrical passage $b$, and is reduced to form a head or enlargement $h$ at its outer end; this head projecting slightly beyond the end of the tubular portion $a$. A spiral spring $i$ surrounds the reduced portion $g$, and bears against the head or enlargement $h$. The rod is further formed near its opposite end with an opening $j$, in which is pivoted the dogs $k$; said dogs normally projecting through the inclined slots $e$—$e$.

In operation, the first two fingers are passed around the projections $d$—$d$, and pressure is applied upon the projecting end of the rod, so as to slide or move said rod in the tubular portion and cause the pivoted dogs to assume the position shown in Fig. 12. The pin is now passed through holes or apertures in the parts to be coupled together, until the slots $e$—$e$ clear the opposite side. The pressure is now removed from the rod, and the spring $i$ exerting its pressure against the inner end of the head or enlargement $h$, causes the rod $f$, to resume its original position and move the pivotal dogs $k$ to the position shown in Fig. 12, and so that said dogs shall lie against the side of the parts coupled opposite to the side against which the projections $d$—$d$ bear, thus locking the parts together. By pressing upon the head end of the rod $f$, the pivoted dogs $k$ are moved down into the inclined slots $e$—$e$, and allow the pin 12 to be removed so that parts may be uncoupled.

From the above description it will be seen that I have produced a combined hay rack, hay stand and hog or sheep wagon, which is comparatively simple, durable and inexpensive of construction and which may readily be converted or reconverted from one device to the other.

Having thus described my invention, what I claim as new, and desire to secure by Letters Patent, is—

1. A combined hay-rack, hay-stand and hog or sheep wagon, comprising a body-portion, racks carried pivotally at each side of said body portion, standards pivotally carried at the front end of said side racks, and an end frame carried upon and closing the front end of the body-portion, and an end frame pivotally carried at the rear end of the body portion, a plate or door pivotally carried by said rear end frame, and wing-frames located at each end of the side-racks and pivotally carried by said plate or door, substantially as set forth.

2. In a combined hay-rack, hay-stand and hog or sheep-wagon, the combination with a body-portion mounted upon a wheeled truck, and racks pivotally carried at each side of said body-portion, and having an opening formed through each of said side-racks above the rear wheels of the wagon truck, of a cover for each opening, consisting of a plate pivotally carried by the rack, at one end, and a second plate pivotally connected to the opposite or free end of the first mentioned plate, and longitudinally adjustable upon the rack, and means to secure the said plate at any desired point of adjustment, substantially as set forth.

3. A hay-rack, comprising a body portion mounted upon a wagon-truck and having side-racks pivotally carried at each side of said body-portion, and end-standards pivotally carried at the front end of each side rack, and detachable brace-bars connecting said vertical standards and the side racks, and an end-frame located at and closing the front end of said body portion and having transverse step-bars and a frame pivotally carried and connected to the rear end of said body-portion, and a lever pivotally carried by the front end-frame and a lifting post having a latch engaging one of the step bars of said end frame and pivotally connected to said lever, substantially as and for the purpose set forth.

4. In a combined hay rack, hay stand and hog or sheep wagon, the combination with the body-portion having a frame closing the front end thereof and a pivotal frame at the rear end thereof, of a rack pivotally carried at each side of the body-portion, and standards pivotally carried at the front end of each rack, and a plate or door pivotally carried by the rear end-frame, and means whereby said hay rack may be elevated, so that said end standards and pivotal plate or door may support the hay-stand in such elevated position, substantially as set forth.

5. In a combined hay-rack, hay-stand and hog or sheep wagon, the combination with a body-portion having a frame closing its front end and racks pivotally carried at each side of said body-portion so that they may be moved to assume a vertical position, of a frame pivotally carried at the rear end of said body-portion and a plate or door pivotally carried by said frame so that they may rest upon the ground at the rear end of the wagon in an inclined position, and wing frames pivotally carried at each side of the end-plate or door so that they may be folded to form side walls at each side of said inclined plate or door, and transverse bars connecting and bracing said wing frames in their vertical positions, substantially as set forth.

6. In a combined hay-rack, hay-stand and hog or sheep wagon, the combination with a body-portion having side racks pivotally carried at each side of said body-portion so as to form a vertical wall, and a frame closing the front end of the body-portion, of a frame at the rear end of the body-portion, and a plate or door closing said end-frame and wing-frames pivotally carried at each side of and folded to the rear side of said end plate or door, and a ring or loop carried by one of said wing frames looped over one of the longitudinal bars of the other wing frame, substantially as and for the purpose set forth.

7. In a combined hay-rack, hay-stand and hog or sheep wagon, the combination with a body-portion having upwardly extended sides and horizontal and inwardly extending flanges at the inner margins of said sides, and detachable brace-bars engaging said flanges and secured thereto by locking-pins, and brace bars extending under said body-portion and having side arms fitting against the outer sides of the sides, and having bifurcated upper ends, and racks carried at each side composed of longitudinal extending bars and transverse bars connecting said longitudinal bars, and pivotally engaged at their inner ends in the upper bifurcated ends of the side arms of said brace-bars, and an extension at the end of each transverse bar bearing against the sides of the body-portion of the rack, substantially as and for the purpose set forth.

8. In a combined hay-rack, hay-stand, and hog or sheep wagon, a side rack formed with an opening near one end and an adjustable cover composed of sections hinged together, and having one of said sections pivotally carried near one end of said recess or opening, and guide slots carried by the rack near the opposite end of said opening or recess and ratchet teeth also formed in said rack adjacent to said slots, and guide pins or trunnions projecting from the free end of said plate or cover and adapted to slide in said guide slots, and a locking pawl adapted to engage the ratchet teeth of said rack, substantially as and for the purpose set forth.

In testimony whereof I affix my signature in the presence of two witnesses.

WILLIAM PRESTON KIMBRELL.

Witnesses:
JAMES DODSON,
J. T. SUMNY.